(12) United States Patent
Kupershmidt et al.

(10) Patent No.: US 9,338,780 B2
(45) Date of Patent: May 10, 2016

(54) SYSTEM, METHOD AND COMPUTER READABLE MEDIUM FOR DECT ULE PAGING AND BROADCAST

(71) Applicants: Haim Kupershmidt, Or Yehuda (IL); Arie Gur, Kiryat Ono (IL); Jochen Kilian, Rothenburg ob der Tauber (DE)

(72) Inventors: Haim Kupershmidt, Or Yehuda (IL); Arie Gur, Kiryat Ono (IL); Jochen Kilian, Rothenburg ob der Tauber (DE)

(73) Assignee: DSP GROUP LTD., Herzeliya (IL)

( * ) Notice: Subject to any disclaimer, the term of this patent is extended or adjusted under 35 U.S.C. 154(b) by 99 days.

(21) Appl. No.: 13/904,056

(22) Filed: May 29, 2013

(65) Prior Publication Data
US 2013/0324139 A1 Dec. 5, 2013

Related U.S. Application Data

(60) Provisional application No. 61/654,087, filed on Jun. 1, 2012.

(51) Int. Cl.
*H04W 4/00* (2009.01)
*H04W 72/04* (2009.01)
*H04M 1/725* (2006.01)
*H04W 52/02* (2009.01)
*H04W 68/02* (2009.01)
*H04W 48/10* (2009.01)

(52) U.S. Cl.
CPC ...... *H04W 72/0453* (2013.01); *H04M 1/72502* (2013.01); *H04W 52/0216* (2013.01); *H04W 68/025* (2013.01); *H04M 2250/08* (2013.01); *H04W 4/00* (2013.01); *H04W 48/10* (2013.01)

(58) Field of Classification Search
CPC ............ H04W 72/0453; H04W 48/10; H04W 52/0216; H04W 68/025; H04M 2250/08; H04M 1/725
USPC ........... 455/450, 434, 452.1, 464, 465, 426.1, 455/435.1, 435.2, 458, 515, 509; 370/350; 379/221.08
See application file for complete search history.

(56) References Cited

U.S. PATENT DOCUMENTS

| 5,910,943 | A  | * | 6/1999 | Wickman | ...................... 370/279 |
| 6,226,515 | B1 | * | 5/2001 | Pauli | ...................... H04B 7/269 370/329 |
| 6,400,949 | B1 | * | 6/2002 | Bielefeld | ............... H04W 72/06 455/434 |
| 6,567,947 | B1 | * | 5/2003 | Lee | ............................... 714/746 |
| 6,580,918 | B1 | * | 6/2003 | Leickel | ................ H04W 88/08 370/529 |

(Continued)

FOREIGN PATENT DOCUMENTS

KR   EP 1063836 A2 * 12/2000 ......... H04M 1/72505

*Primary Examiner* — Olumide T Ajibade Akonai
(74) *Attorney, Agent, or Firm* — Reches Patents

(57) ABSTRACT

An ultra low energy (ULE) digital enhanced cordless telecommunication (DECT) base station that includes a scheduler that is arranged to dynamically determine a schedule of transmissions of broadcast messages and of paging messages to be received by DECT ULE devices; a dummy bearer generator arranged to generate dummy bearers in response to the schedule; wherein each dummy bearer comprises a multiple usage field and a usage indicative field; wherein the usage indicative field is indicative of a selected usage of the multiple usage field; wherein the selected usage purpose is selected out of at least a conveyance of a broadcast message and a conveyance of a paging message; a configuration module that is arranged to generate location information indicative of a location of at least one bit allocated within at least one dummy bearer for indicating, when flagged, of a presence of a paging message or a broadcast message aimed to at least one of the DECT ULE devices; and a transmitter that is arranged to transmit to the DECT ULE devices the dummy bearers and the location information.

21 Claims, 10 Drawing Sheets

(56) References Cited

U.S. PATENT DOCUMENTS

| | | | |
|---|---|---|---|
| 6,690,943 B1 * | 2/2004 | Forde | H04W 72/005 455/465 |
| 7,079,568 B1 * | 7/2006 | Boetzel et al. | 375/132 |
| 8,548,482 B2 * | 10/2013 | Karls et al. | 455/450 |
| 8,594,071 B2 * | 11/2013 | Alberti et al. | 370/350 |
| 8,804,590 B2 * | 8/2014 | Nakae et al. | 370/311 |

* cited by examiner

FIG. 2C

17 → | Miscellaneous first sub-field bits 17(1) | Twelve MSB bits of RFPI 17(2) | USE FOR PAGING 17(3) | USE FOR BROADCAST 17(4) | BITMAP OF PAGING BITS 17(5) |

19 → | Miscellaneous third sub-field bits 21(1) | BROADCAST MESSAGE 21(2) |

FIG. 2D

17 → | Miscellaneous first sub-field bits 17(1) | BITMAP OF PAGING BITS 17(2) | USE FOR PAGING 17(3) | USE FOR BROADCAST 17(4) | BITMAP OF PAGING BITS 17(5) |

19 → | Miscellaneous third sub-field bits 21(1) | BROADCAST MESSAGE 21(2) |

FIG. 2E

17 → | Miscellaneous first sub-field bits 17(1) | 17(5) | 17(6) | USE FOR PAGING 17(3) | USE FOR BROADCAST 17(4) | BITMAP OF PAGING BITS 17(5) |

19 → | Miscellaneous third sub-field bits 21(1) | BROADCAST MESSAGE 21(2) |

FIG. 2F

17 →
| Miscellaneous first sub-field bits 17(1) | Twelve MSB bits of RFPI 17(2) | USE FOR BROADCAST 17(3) | USE FOR PAGING 17(4) | BROADCAST MESSAGE 17(5) |

19 →
| Miscellaneous third sub-field bits 21(1) | BITMAP OF PAGING BITS 21(2) |

FIG. 2G

17 →
| Miscellaneous first sub-field bits 17(1) | Twelve MSB bits of RFPI 17(2) | RESERVED 17(3) | USE FOR PAGING 17(4) | RESERVED 17(5) |

19 →
| Miscellaneous third sub-field bits 21(1) | BITMAP OF PAGING BITS 21(2) |

FIG. 2H

17 →
| Miscellaneous first sub-field bits 17(1) | Twelve MSB bits of RFPI 17(2) | USE FOR BROADCAST 17(3) | RESERVED 17(4) | BROADCAST MESSAGE 17(5) |

19 →
| Miscellaneous third sub-field bits 21(1) | RESERVED 21(2) |

| Miscellaneous first sub-field bits 17(1) | Twelve MSB bits of RFPI 17(2) | RESERVED 17(3) | USE FOR BROADCAST 17(4) | RESERVED 17(5) |

↗ 17

| Miscellaneous third sub-field bits 21(1) | BROADCAST MESSAGE 21(2) |

| Miscellaneous first sub-field bits 17(1) | Twelve MSB bits of RFPI 17(2) | USE FOR PAGING 17(3) | RESERVED 17(4) | BITMAP OF PAGING BITS 17(5) |

↗ 17

| Miscellaneous third sub-field bits 21(1) | RESERVED 21(2) |

| Miscellaneous first sub-field bits 17(1) | Twelve MSB bits of RFPI 17(2) | RESERVED 17(3) | RESERVED 17(4) | RESERVED 17(5) |

↗ 17

| Miscellaneous third sub-field bits 21(1) | RESERVED 21(2) |

| Multiframe 0 | | | | | | | | | | | | | | | | |
|---|---|---|---|---|---|---|---|---|---|---|---|---|---|---|---|---|
| FCNT | 0 | 1 | 2 | 3 | 4 | 5 | 6 | 7 | 8 | 9 | 10 | 11 | 12 | 13 | 14 | 15 |
| Imm Page Offset | 0 | 1 | | | 0 | | 1 | | 0 | | 1 | | 0 | | 1 | |
| Slow Page Offset | | | | 3 | | | | 4 | | | | 5 | | | | 6 |
| Broadcast Use | v | | | | | v | | | | v | | | | v | | |
| Multiframe 1 | | | | | | | | | | | | | | | | |
| FCNT | 0 | 1 | 2 | 3 | 4 | 5 | 6 | 7 | 8 | 9 | 10 | 11 | 12 | 13 | 14 | 15 |
| Imm Page Offset | 0 | 1 | | | 0 | | 1 | | 0 | | 1 | | 0 | | 1 | |
| Slow Page Offset | | | | 7 | | | | 8 | | | | 9 | | | | 10 |
| Broadcast Use | v | | | | | v | | | | v | | | | v | | |
| Multiframe 2 | | | | | | | | | | | | | | | | |
| FCNT | 0 | 1 | 2 | 3 | 4 | 5 | 6 | 7 | 8 | 9 | 10 | 11 | 12 | 13 | 14 | 15 |
| Imm Page Offset | 0 | 1 | | | 0 | | 1 | | 0 | | 1 | | 0 | | 1 | |
| Slow Page Offset | | | | 11 | | | | 12 | | | | 13 | | | | 14 |
| Broadcast Use | v | | | | | v | | | | v | | | | v | | |
| Multiframe 3 | | | | | | | | | | | | | | | | |
| FCNT | 0 | 1 | 2 | 3 | 4 | 5 | 6 | 7 | 8 | 9 | 10 | 11 | 12 | 13 | 14 | 15 |
| Imm Page Offset | 0 | 1 | | | 0 | | 1 | | 0 | | 1 | | 0 | | 1 | |
| Slow Page Offset | | | | 15 | | | | 16 | | | | 17 | | | | 18 |
| Broadcast Use | v | | | | | v | | | | v | | | | v | | |

Generating dummy bearers that include a sequence of fields that includes a preamble field, a synchronization field, a control information field, a first cyclic redundancy check (CRC) field, a synchronization word field, a second CRC field, a first sub-field that includes a first multiple usage field and a pair of usage indicative fields, a third CRC field, a synchronization information subfield, a fourth CRC field, a third sub-field that includes the second multiple usage field, and a fifth CRC field. 221

Generating dummy bearers that include a sequence of fields that includes a preamble field, a synchronization field, a control information field, a first cyclic redundancy check (CRC) field, a synchronization word field, a second CRC field, a first sub-field that includes a first multiple usage field and a pair of usage indicative fields, a third CRC field, a synchronization information subfield, a fourth CRC field, a third sub-field that includes the second multiple usage field, and a fifth CRC field. The first sub-field further includes a third multi usage field. 222

Generating a dummy bearer that includes a broadcast message that includes a paging identifier that identifies a certain DECT ULE device of the DECT ULE devices as a target to the broadcast message; wherein the paging identifier is shorter than a temporary portable user identity (TPUI) allocated to the certain DECT ULE device. The paging identifier may have a length that ranges between eight bits and eighteen bits. 223

Sending to a group of DECT ULE devices a group identifier and generating a broadcast message that includes the group identifier that identifies the group of DECT ULE devices as a target to the broadcast message. 224

Generating dummy bearers with a plurality of multiple usage fields and one or more usage indicative fields associated with the plurality of the multiple usage fields. 225

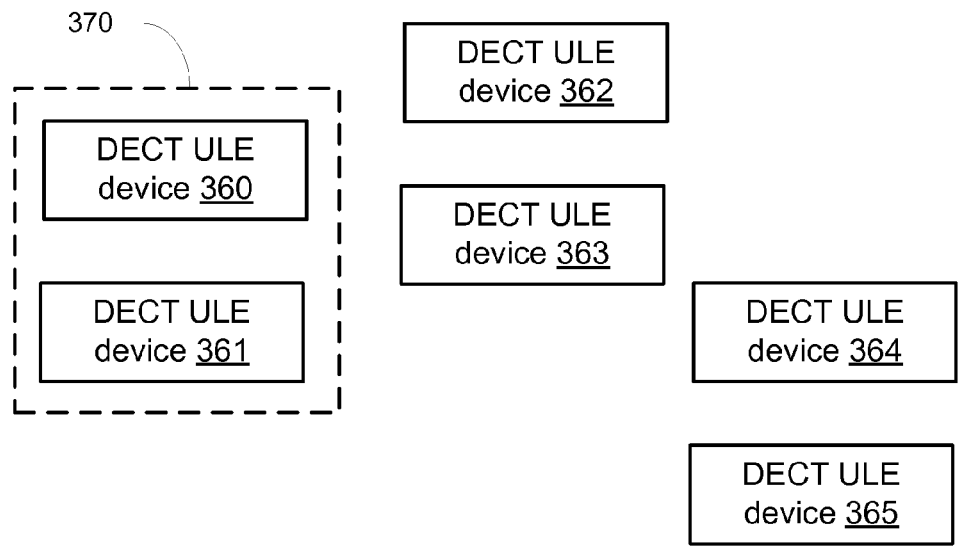
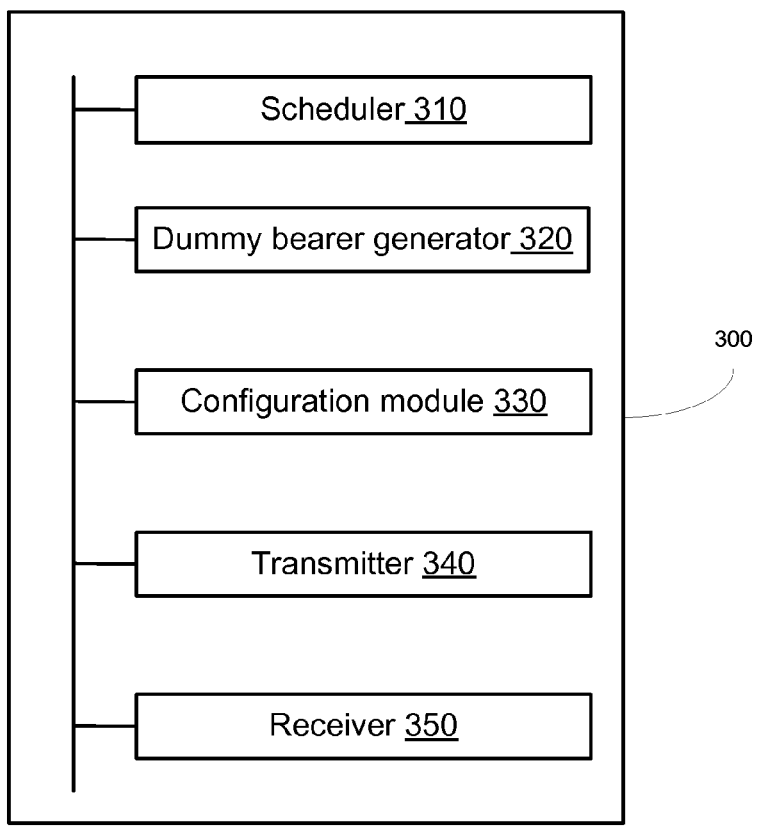
FIG. 7

SYSTEM, METHOD AND COMPUTER READABLE MEDIUM FOR DECT ULE PAGING AND BROADCAST

RELATED APPLICATIONS

This application claims priority from U.S. provisional patent Ser. No. 61/654,087 filing date Jun. 1, 2012 which is incorporated herein by reference.

BACKGROUND

Ultra Low Energy (ULE) Digital Enhanced Cordless Telecommunications (DECT) is a modern communication standard that was adopted by many communication vendors. A DECT ULE base station may communicate with other DECT ULE devices and may control the communication between itself and the other DECT ULE devices.

A communication channel between a DECT ULE base station and DECT ULE devices is used for conveying data packets (such as events (e.g. alarm), measurement (e.g. temperature, AC power consumption, etc.)) and additional information such as configuration and control of devices.

The DECT ULE standard reuses a structure of a 160 ms superframe defined in the original DECT standard. Each superframe includes sixteen 10 ms frames, and each frame includes twenty four timeslots (slots). As there are ten different frequency carriers there are 240 slot/carrier pairs.

A DECT ULE frame is nominally split into two equal halves—slots 0-11 are allocated for down-link transmission (base station to device) and slots 12-23 are allocated for up-link transmission (devices to base station).

A DECT ULE frame can also be used as a bearer. A bearer is a periodic transmission on a particular slot/carrier pair. A bearer can be a traffic bearer or a dummy bearer (also known as beacon).

DECT ULE reuses the Dummy Bearer/Beacon of DECT and adds new fields to it, to address the needs of DECT ULE devices. The dummy bearer usage in DECT ULE has the following challenges:
   a. Support of a big number of DECT ULE devices. Unlike the original DECT which supports up to 12 handsets concurrently, DECT ULE must support hundreds of devices
   b. Variable latency for different types of devices. For example, devices that are responsible for switching of light should have very short latency (up to ~40 msec), while other devices (e.g. metering devices) can tolerate many tenths of seconds latency. Thus, the latency of the DECT ULE paging channel needs to be flexible and configurable.
   c. Flexibility—the beacon is a scarce resource in terms of bits and bandwidth available . . . . Thus, it is important to reuse the same fields for different purposes (e.g. paging/broadcast), as well as keep possibility to still extend the same fields for future use (e.g. Information Elements, similar to 802.11 beacons) by reuse/overload.

SUMMARY

According to an embodiment of the invention a method may be provided for ultra low energy (ULE) digital enhanced cordless telecommunication (DECT), the method may include: dynamically determining a schedule of transmissions of broadcast messages and of paging messages to be received by DECT ULE devices; generating and transmitting, by a DECT ULE base station, dummy bearers in response to the schedule; wherein each dummy bearer comprises a multiple usage field and a usage indicative field; wherein the usage indicative field is indicative of a selected usage of the multiple usage field; wherein the selected usage purpose is selected out of at least a conveyance of a broadcast message and a conveyance of a paging message; and sending to the DECT ULE devices location information indicative of at least one paging bit allocated within at least one dummy bearer for indicating, when flagged, of a presence of a paging message or a broadcast message aimed to at least one of the DECT ULE devices.

The method may include generating dummy bearers with a plurality of multiple usage fields and one or more usage indicative fields associated with the plurality of the multiple usage fields.

The method may include generating dummy bearers that may include a sequence of fields that may include a preamble field, a synchronization field, a control information field, a first cyclic redundancy check (CRC) field, a synchronization word field, a second CRC field, a first sub-field that may include a first multiple usage field and a pair of usage indicative fields, a third CRC field, a synchronization information subfield, a fourth CRC field, a third sub-field that may include the second multiple usage field, and a fifth CRC field.

The first sub-field may include a third multi usage field.

The method may include generating a dummy bearer that may include a broadcast message that may include a paging identifier that identifies a certain DECT ULE device of the DECT ULE devices as a target to the broadcast message; wherein the paging identifier may be shorter than a temporary portable user identity (TPUI) allocated to the certain ULE DECT device.

The paging identifier may have a length that ranges between eight bits and eighteen bits.

The method may include sending to a group of DECT ULE devices a group identifier and generating a broadcast message that may include the group identifier that identifies the group of DECT ULE devices as a target to the broadcast message.

The at least one paging bits may be allocated for indicating, when flagged, of a presence of a paging message or a broadcast message aimed to a group of DECT ULE devices.

The location information may be indicative of a location, within a super frame and a frame, of the at least one paging.

The location information may be indicative of a repetition period of the appearance of the at least one paging bit.

According to an embodiment of the invention an ultra low energy (ULE) digital enhanced cordless telecommunication (DECT) base station may be provided that may include a scheduler that may be arranged to dynamically determine a schedule of transmissions of broadcast messages and of paging messages to be received by DECT ULE devices; a dummy bearer generator arranged to generate dummy bearers in response to the schedule; wherein each dummy bearer may include a multiple usage field and a usage indicative field; wherein the usage indicative field may be indicative of a selected usage of the multiple usage field; wherein the selected usage purpose may be selected out of at least a conveyance of a broadcast message and a conveyance of a paging message; a configuration module that may be arranged to generate location information indicative of a location of at least one bit allocated within at least one dummy bearer for indicating, when flagged, of a presence of a paging message or a broadcast message aimed to at least one of the DECT ULE devices; and a transmitter that may be arranged to transmit to the DECT ULE devices the dummy bearers and the location information.

The dummy bearer generator may be arranged to generate dummy bearers with a plurality of multiple usage fields and one or more usage indicative fields associated with the plurality of the multiple usage fields.

The dummy bearer generator may be arranged to generate dummy bearers that comprise a sequence of fields that comprise a preamble field, a synchronization field, a control information field, a first cyclic redundancy check (CRC) field, a synchronization word field, a second CRC field, a first sub-field that may include a first multiple usage field and a pair of usage indicative fields, a third CRC field, a synchronization information subfield, a fourth CRC field, a third sub-field that may include the second multiple usage field, and a fifth CRC field.

The first sub-field further may include a third multi usage field.

The dummy bearer generator may be arranged to generate a dummy bearer that may include a broadcast message that may include a paging identifier that identifies a certain DECT ULE device of the DECT ULE devices as a target to the broadcast message; wherein the paging identifier may be shorter than a temporary portable user identity (TPUI) allocated to the certain DECT ULE device.

The paging identifier may have a length that ranges between eight bits and eighteen bits.

The configuration element may be arranged to send to a group of DECT ULE devices a group identifier and wherein the dummy bearer generator may be arranged to generate a dummy bearer that may include a broadcast message that may include the group identifier that identifies the group of DECT ULE devices as a target to the broadcast message.

According to an embodiment of the invention there may be provided a non-transitory computer readable medium that stores instructions that once executed by a ultra low energy digital enhanced cordless telecommunication (DECT ULE) base station causes the DECT ULE base station to: dynamically determine a schedule of transmissions of broadcast messages and of paging messages to be received by DECT ULE devices; generate and transmit dummy bearers in response to the schedule; wherein each dummy bearer may include a multiple usage field and a usage indicative field; wherein the usage indicative field may be indicative of a selected usage of the multiple usage field; wherein the selected usage purpose may be selected out of at least a conveyance of a broadcast message and a conveyance of a paging message; and send to the DECT ULE devices location information indicative of at least one bit allocated within at least one dummy bearer for indicating, when flagged, of a presence of a paging message or a broadcast message aimed to at least one of the DECT ULE devices.

The non-transitory computer readable medium may store instructions that once executed by the DECT ULE base station causes the DECT ULE base station to generate dummy bearers with a plurality of multiple usage fields and one or more usage indicative fields associated with the plurality of the multiple usage fields.

The non-transitory computer readable medium may store instructions that once executed by the DECT ULE base station causes the DECT ULE base station to generate dummy bearers that may include a sequence of fields that may include a preamble field, a synchronization field, a control information field, a first cyclic redundancy check (CRC) field, a synchronization word field, a second CRC field, a first sub-field that may include a first multiple usage field and a pair of usage indicative fields, a third CRC field, a synchronization information subfield, a fourth CRC field, a third sub-field that may include the second multiple usage field, and a fifth CRC field.

The first sub-field may include a third multi usage field.

The non-transitory computer readable medium may store instructions that once executed by the DECT ULE base station causes the DECT ULE base station to generate a dummy bearer that may include a broadcast message that may include a paging identifier that identifies a certain DECT ULE device of the DECT ULE devices as a target to the broadcast message; wherein the paging identifier may be shorter than a temporary portable user identity (TPUI) allocated to the certain ULE DECT device.

The paging identifier may have a length that ranges between eight bits and eighteen bits.

The non-transitory computer readable medium may store instructions that once executed by the DECT ULE base station causes the DECT ULE base station to send to a group of DECT ULE devices a group identifier and generating a broadcast message that may include the group identifier that identifies the group of DECT ULE devices as a target to the broadcast message.

The at least one paging bits may be allocated for indicating, when flagged, of a presence of a paging message or a broadcast message aimed to a group of DECT ULE devices.

The location information may be indicative of a location, within a super frame and a frame, of the at least one paging.

The location information may be indicative of a repetition period of the appearance of the at least one paging bit.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2C illustrates a portion of a dummy bearer according to an embodiment of the invention;

FIG. 2D illustrates a portion of a dummy bearer according to an embodiment of the invention;

FIG. 2E illustrates a portion of a dummy bearer according to an embodiment of the invention;

FIG. 2F illustrates a portion of a dummy bearer according to an embodiment of the invention;

FIG. 2G illustrates a portion of a dummy bearer according to an embodiment of the invention;

FIG. 2H illustrates a portion of a dummy bearer according to an embodiment of the invention;

FIG. 2I illustrates a portion of a dummy bearer according to an embodiment of the invention;

FIG. 2J illustrates a portion of a dummy bearer according to an embodiment of the invention;

FIG. 2K illustrates a portion of a dummy bearer according to an embodiment of the invention;

FIG. 3 illustrates multiple multiframes according to an embodiment of the invention;

FIG. 6 illustrates various stages of a stage of the method of FIG. 7 according to an embodiment of the invention; and FIG. 7 illustrates a DECT ULE base station and multiple DECT ULE devices according to an embodiment of the invention.

Figure 1:
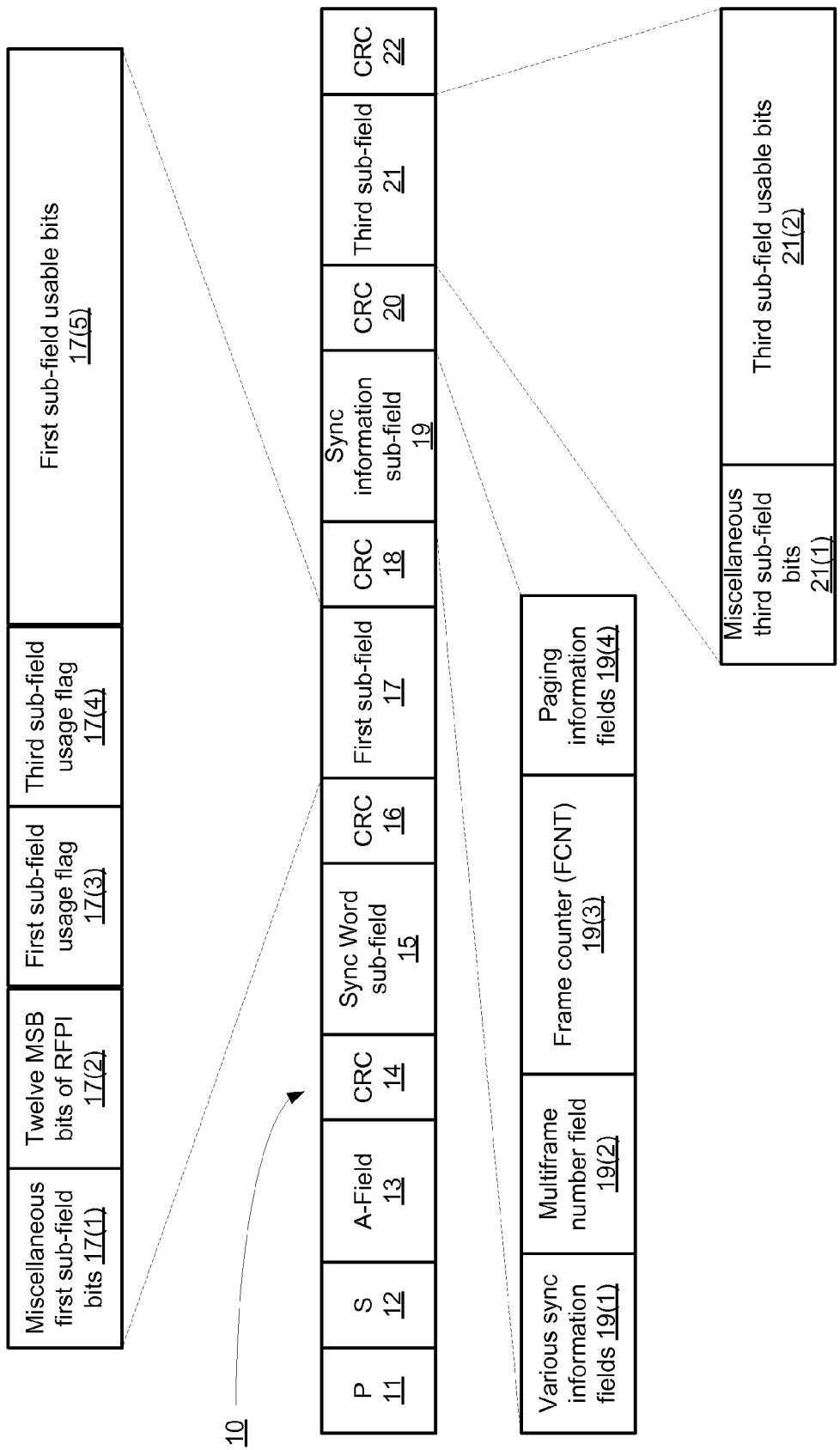
FIG. 1 illustrates a dummy bearer according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The terms multiframe and superframe are used in an interchangeable manner.

Any reference to a single paging bit should be interpreted as a reference to multiple paging bits.

There is provided a DECT ULE paging scheme that DECT ULE satisfies all the requirements on paging and broadcast.

The DECT ULE paging scheme can support the following requirements:
  a. It should be possible to address up to 500 DECT ULE devices individually. Alternatively, the number of DECT ULE devices can exceed 500. There is a trade-off between latency and number of DECT devices that can be supported.
  b. It should be possible to page and/or broadcast to groups of DECT ULE devices.
  c. Different paging channels shall be supported, and can be determined in a flexible manner—and may be changed over time and/or from system to system—to fit the requirement of each system. An example of a configuration may include the following: (i) Immediate paging channel for DECT ULE devices which are locked to the base all the time (or at least every 40 ms); Fast paging channel for DECT ULE devices which lock to the base at least every 30 seconds; and Slow paging channel for DECT ULE devices which lock to the base at least every 10 minutes. It is noted that any DECT ULE device that locks the base less frequently than once every 10 minutes is deemed to be unpageable. The number of DECT devices per each class of DECT ULE devices can be dynamically changed. DECT ULE devices that should be more frequently monitored or pages can require more allocated paging bits per time period. It is noted that the number of DECT ULE device types can differ from three, that there may be different types of DECT ULE devices (not just fast, intermediate and slow), that timing parameters related to each type of device may differ from those illustrated in the specification.
  d. Application paging/data broadcast shall be supported. This could be useful for certain application profiles (e.g. turning on a scene at home, to include lights, music, TV, etc.). The basic concept is to allow the broadcast of some data field which is specific to, and under the control of, the application protocol.
  e. Flexible usage of dummy bearer fields—the use of beacon fields (Sub-fields 1 and 3) should be flexible and allow use of subfields 1 and 3 either for paging, broadcast data, or other future use ("Reserved").
  f. Flexible usage of paging parameters: The scheme should allow flexible paging latency for a specific DECT ULE device, e.g. from 20 ms up to, say $2^{10}$ frames (~100 sec), should allow support of a large range of numbers of DECT ULE devices. There is a trade-off between the number of DECT ULE devices supported and max latency.

According to an embodiment of the invention the DECT ULE paging and broadcast scheme is based on the following principles:
  a. The usage of frames is dynamic and flexible. The DECT ULE base station can change the allocation of paging bits. Paging messages and/or broadcast messages related to certain DECT ULE devices over time.
  b. Each DECT ULE device (or group of DECT ULE devices) is allocated its own one or more "paging bit" that when flagged indicated of a presence of a paging or broadcast message. A single DECT ULE device can belong to one or more DECT ULE groups, and each DECT ULE group can be associated with its own one or more paging bits. There may be cases that a single paging message can include a paging bit aimed to a single ULE DECT device and one or more paging bits directed to a group of ULE DECT devices that include that ULE DECT device. The "paging bit" is included in the dummy bearer and the DECT ULE device is notified about the location of the paging bit by location information (that is not included in the dummy bearer). The location information may include a Start_MFN—the multi-frame number (#MFN) of the relevant multi-frame, and a Start_FCNT—the relevant frame (# FCNT) within the relevant multi-frame that serves as a dummy bearer. The location information may also include an offset (Bit Offset) in the relevant frame—or within one or more sub-fields allocated for conveying a paging message. Alternatively—the Bit Offset may be determined by other means and may, for example, be driven from the identifier of the relevant DECT ULE device (for example—an intermediate result can be calculated by applying a modulo operation (for example a base 92 module operation—as the first and third sub-fields include 92 bits) on a DECT ULE device identifier (DevNumber) and if the result (R) is smaller than 36 then the paging bit is the R'th bit of the first sub-field, else is the (R-36)'th bit of the sub-field).

c. The DECT ULE device also receives PagingPeriod information that indicates the period (in multiframes) between consecutive paging messages. Each DECT ULE device may be provided with a dedicated paging period.

Application level broadcast may use the same first and third subfields when these are not used by paging.

The particular use of the multiple usage fields such as Subfields 1, 3 can be left implementation-dependent, and are as flexible as one may choose to implement. Alternatively, the same "Reserved" usage may be standardized in the future for operation interoperable between different vendors.

By defining usage indicative fields such as subfields, SF1 and SF3 (denoted 17(3) and 17(4) in FIGS. 1 and 2A-2E), the particular use of the resources of Subfields 1, 3 is kept flexible and left implementation-dependent, as follows—SFx field: Subfield x Use (x=⅓): 00—Subfield x does not carry any info; 01—Subfield x is used for paging; 10—Subfield x is used for broadcast data; and 11—Spare/Reserved.

Assignment of Paging Identity.

The normal DECT TPUI is 20 bits, which is bigger than needed and would be wasteful of bandwidth, so a new 9-bit paging identifier (if up to 500 DECT ULE devices are supported) can be used for DECT ULE paging and/or broadcast. This paging identifier can be included in broadcast messages to indicate which DECT ULE devices should respond to the broadcast message.

The paging identity may be unique to the DECT ULE device for the current DECT ULE base station.

A DECT ULE device can only ever have a single paging ID assigned at any time—but may also be associated with one or more group identifiers.

Assignment of the Paging Parameters.

A set of messages is assumed to configure specific DECT ULE device (or DECT ULE Group of devices) parameters, namely: Start_MEN, Start_FCNT, and PagingPeriod N.

According to another embodiment of the invention each DECT ULE device can also receive a BroadcastSearchWindow parameter that determines a maximal length (in superframes)) between a superframe that includes DECT ULE the broadcast message for DECT ULE device. It is noted that the paging bit may not be retransmitted, since it may be transmitted again only after its period.

If the BroadcastSearchWindow passes from a flagged paging bit of a DECT ULE device without paging message detected, than the DECT ULE device should contact the DECT ULE base station.

Each DECT ULE device has a parameter BroadcastSearchWindow, which is the number of frames it shall look for a broadcast message directed to this DECT ULE device, after beacon in which the asserted paging bit (aimed to that DECT ULE device) is received by the DECT ULE device.

In order to allow DECT ULE devices to save power when waiting for application broadcast, the following may be implemented:

a. A paging bit flagged for a specific DECT ULE device may notify either paging message or broadcast message.

b. When a Broadcast is pending to a specific DECT ULE device, a paging bit to the same DECT ULE device is also flagged.

FIG. 3 provides an example of "simple" use of the scheme according to an embodiment of the invention.

This figure illustrates a scheduling scheme that supports, for example, only 2 different paging channels with different timing behavior:

Immediate, with 40 msec latency, up to (56+36)×2=184 DECT ULE devices. The parameters of the paging for these DECT ULE devices are:

a. Start_MFN_FCNT: FCNT—any even value, MFN—any value, PagingPeriod: N=2=>periodicity is 2^2=4 frames, Bit Offset=DevNumber mod 92, wherein if Bit Offset<=36 then the notification is in Subfield 1, at bit position=Bit Offset, and if Bit Offset>36=>the notification is in Subfield 1, at bit position=Bit Offset–36.

Slow, with 640 msec, up to (56+36)×16=1472 DECT ULE devices. The parameters of the paging for these DECT ULE devices are: Start_MFN_FCNT: FCNT=4 n–1, n=1, 2, 3, 4; MFN—any value; PagingPeriod: N=4=>periodicity is 2^4=16 frames; Bit Offset=DevNumber mod 92; Bit Offset=DevNumber mod 92, wherein if Bit Offset<=36 then the notification is in Subfield 1, at bit position=Bit Offset, and if Bit Offset>36=>the notification is in Subfield 1, at bit position=Bit Offset–36.

Beacons in frames with FCNT of 4K+1 (K=0, 1, . . . ) can be allocated for Broadcast info only, without paging.

Group paging can be applied by allocating a group identifier for each DECT ULE devices that belong to a group, sending the group identifier to the members of each group and allocating a paging bit for the group within the paging messages. The location of that bit is provided to members of the group at the same manner as location information provided to a single DECT ULE device. In addition, the group identifier may be included in each broadcast message aimed to be responded by the members of the group.

Registration/configuration—After DECT registration and first location procedures, there will be the need for some ULE-specific exchanges/configuration. This may include assignment of paging ID, paging parameters and other ULE-specific things, e.g. ULE DECT ULE device type, supported protocols, etc.

The dummy bearer can use the 12 MSB bits of RFPI for paging or broadcast.

FIG. 1 illustrates a dummy bearer 10 according to an embodiment of the invention.

The dummy bearer 10 includes: preamble (P) field 11, a synchronization (S) field 12, a control information (A-field) field 13, a first cyclic redundancy check (CRC) field 14, a synchronization word field (Sync Word sub-field) 15, a second CRC field 16, a first sub-field 17, a third CRC field, a synchronization information subfield 19, a fourth CRC field 20, a third sub-field 21 and a fifth CRC field 22.

The first sub-field 17 is a first multi usage field and includes miscellaneous first sub-field bits 17(1), twelve most significant bits (MSB) of RFPI 17(2), first sub-field usage flag 17(3), third sub-field usage flag 17(4) and first sub-field usable bits 17(5) that can be used for multiple purposes including paging and broadcast.

The second sub-fields 19 includes various synchronization fields 19(1), multiframe number field 19(2), frame counter (FCNT) field 19(3) and paging information fields 19(4).

Figure 2A:
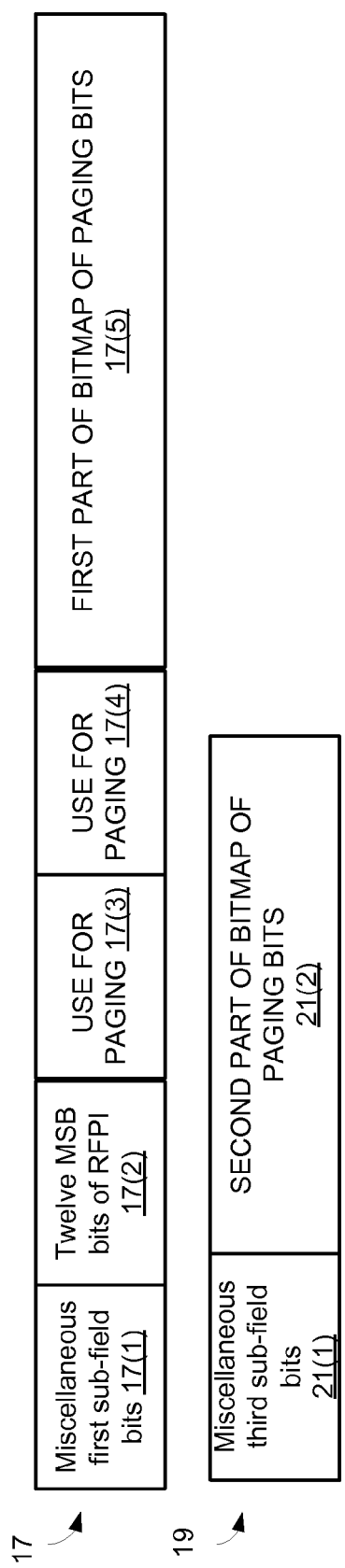
FIG. 2A illustrates a portion of a dummy bearer according to an embodiment of the invention.
Figure 2B:
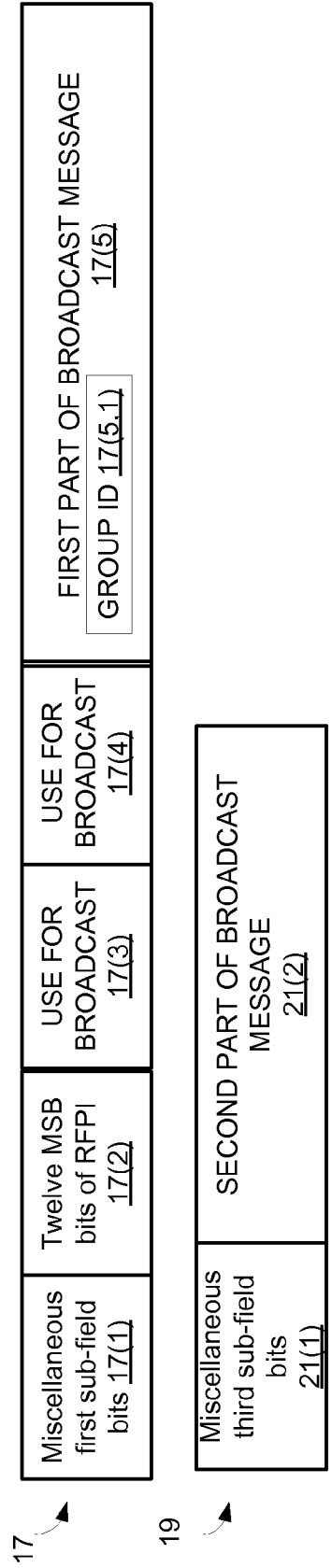
FIG. 2B illustrates a portion of a dummy bearer according to an embodiment of the invention.

FIGS. 2A-2C illustrate different scenarios in which the first and third sub-fields are used for conveying broadcast messages and paging messages, and FIGS. 2D-2E also illustrate using the 12 MSB bits of RFPI for paging or broadcast.

Table 1 illustrates the values of various fields of FIGS. 2A-2E:

TABLE 1

| Fields | FIG. 2A | FIG. 2B | FIG. 2C | FIG. 2D | FIG. 2E |
|---|---|---|---|---|---|
| 17(3) | Use for paging | Use for broadcast | Use for paging | Use for paging | Use for paging |
| 17(4) | Use for paging | Use for broadcast | Use for broadcast | Use for broadcast | Use for broadcast |
| 17(5) | First part of bitmap of paging bits | First part of broadcast message | Bitmap of paging bits | Bitmap of paging bits | Bitmap of paging bits |
| 21(2) | Second part of bitmap of paging bits | Second part of broadcast message | Broadcast message | Broadcast message | Broadcast message |
| 17(2) | MSB of RFPI | MSB of RFPI | MSB of RFPI | Bitmap of paging bits | Includes multi usage bits 17(5) and third sub-field usage flag 17(6) |

Table 2 illustrates the values of various fields of FIGS. 2F-2K:

TABLE 2

| Fields | FIG. 2F | FIG. 2G | FIG. 2H | FIG. 2I | FIG. 2J | FIG. 2K |
|---|---|---|---|---|---|---|
| 17(3) | Use for broadcast | Use for reserved | Use for broadcast | Use for reserved | Use for paging | Use for reserved |
| 17(4) | Use for paging | Use for paging | Use for reserved | Use for broadcast | Use for reserved | Use for reserved |
| 17(5) | Bitmap of paging bits | Reserved | Broadcast message | Reserved | Bitmap of paging bits | Reserved |
| 21(2) | Bitmap of paging bits | Bitmap of paging bits | Reserved | Broadcast message | Reserved | Reserved |

Figure 4:
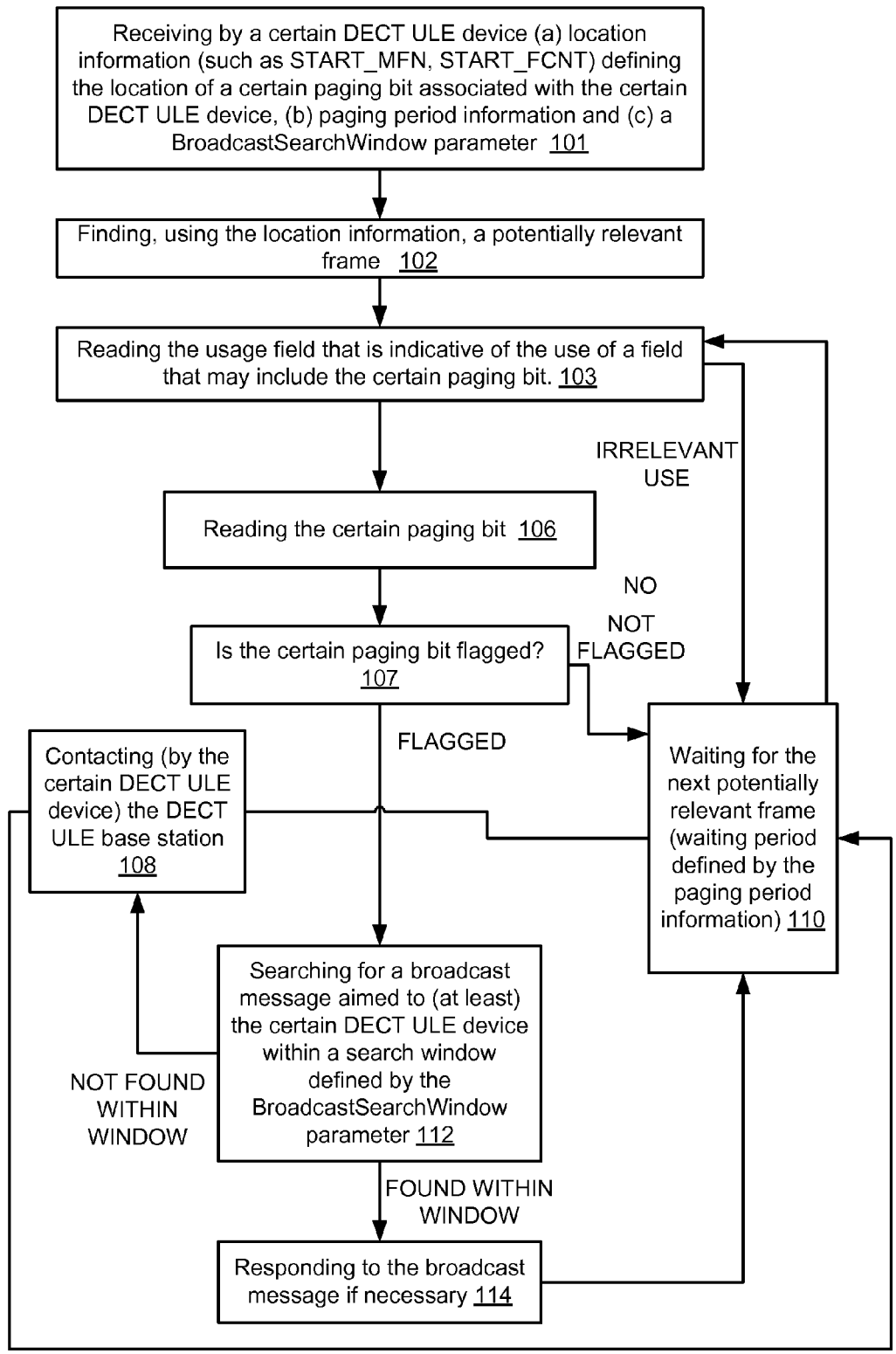
FIG. 4 illustrates a method according to an embodiment of the invention.

FIG. 4 illustrates a method 100 according to an embodiment of the invention.

Method 100 is executed by a DECT ULE device that may communicate with a DECT ULE base station.

Method 100 starts by stage 101 of receiving by a certain DECT ULE device (a) location information (such as START_MFN, START_FCNT and the like) defining the location of a certain paging bit associated with the certain DECT ULE device, (b) paging period information and (c) a BroadcastSearchWindow parameter. The location information may include receiving a Start_MFN—the multi-frame number (#MFN) of the relevant multi-frame, and a Start_FCNT—the relevant frame (# FCNT) within the relevant multi-frame that serves as a dummy bearer. Stage 101 may also include receiving an offset (Bit Offset) in the relevant frame—or within one or more sub-fields allocated for conveying a paging message. Alternatively, the BitOffset can be determined in other manners—it may be, for example, a function of the identifier of the DECT ULE device.

Stage 101 may be followed by stage 102 of finding, using the location information, a relevant frame. The relevant frame may include one or more paging bit that may be flagged to indicate that relevant content is transmitted to the DECT ULE device. The DECT ULE device can wake up before the relevant frame and may shut down (or not search for such transmissions and thereby save power) after the reception and the processing of the relevant portion of the frame (e.g. if a frame does not contain paging information at all, or the proper field does not contain the relevant paging information).

Stage 102 may be followed by stage 103 of reading the usage field (for example—usage fields 17(3) and 17(4) of FIGS. 2A-2K) that is indicative of the use of a field that may include the certain paging bit. The location information is indicative of the usage field. The location of the use field within the frame is known in advance.

If there are more than a single usage field within the relevant frame (for example—two usage fields 17(3) and 17(4) of FIGS. 2A-2K) then the DECT ULE device can search for the usage field that is deemed to be relevant to its one or more paging bit.—Thus, if the paging bit is located within the first sub-field 17(5) then the DECT ULE device should look for first usage field 17(3).

If the usage (as indicated by the relevant usage field) is deemed to be irrelevant (for example—not paging or broadcast) then the DECT ULE device can wait until the next relevant frame (stage 110).

Stage 103 may be followed by stage 106 of reading the certain paging bit—that is relevant to the DECT ULE device. As indicated above the certain paging bit is located by using the location information.

Stage 106 may be followed by stage 107 of checking whether the certain paging bit is flagged.

Stage 107 may be followed by stage 110 if the paging bit is not flagged.

If the certain paging bit is flagged then stage 107 is followed by stage 112 of searching for a broadcast message aimed to (at least) the certain DECT ULE device within a search window defined by the BroadcastSearchWindow parameter. The search window can start from the frame that follows the relevant frame (that includes the certain paging bit) or may start from the relevant frame itself (if, for example, one of the first and third sub-fields is allocated for paging and the second sub-field is allocated for broadcast message). The value of the BroadcastSearchWindow can indicate the number of dummy bearers that should be searched for the broadcast message.

Stage 110 may include waiting for the new appearance of the certain paging bit, the waiting period is defined by the paging period information. Stage 110 may be followed by stage 102.

Stage 112 may be followed by stage 114 of responding to the broadcast message—if such a response is necessary as there are some broadcast messages that do not require a response.

Stage 112 may be followed by stage 108. Stages 108 and 114 may be followed by stage 110.

Figure 5:
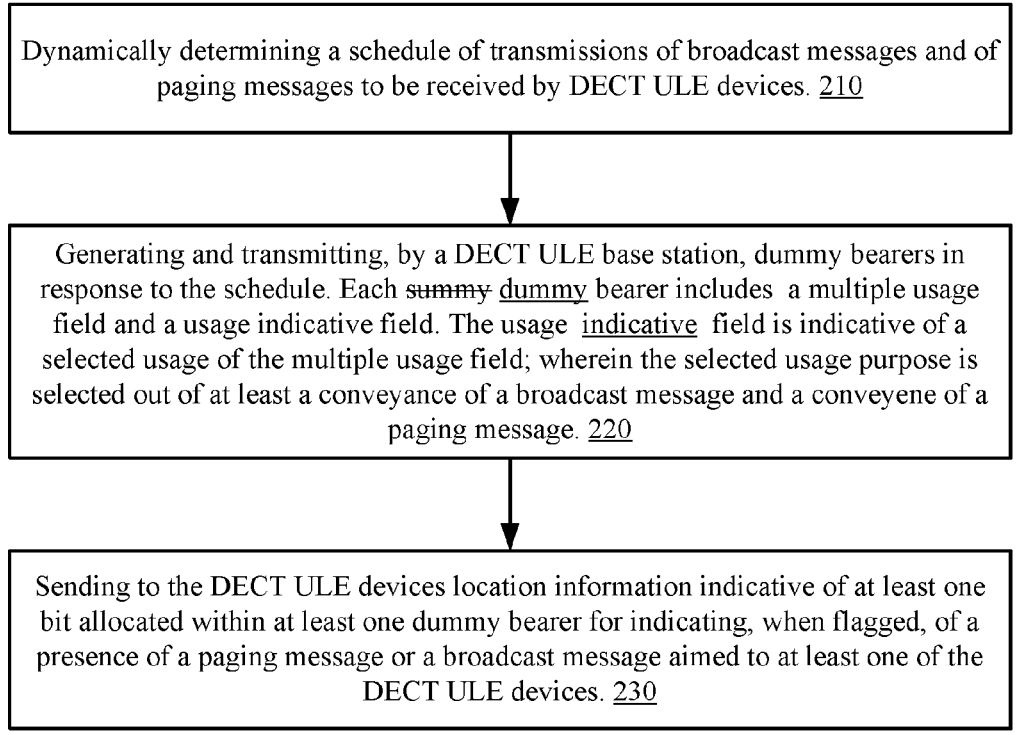
FIG. 5 illustrates a method according to an embodiment of the invention.

FIG. 5 illustrates method 200 according to an embodiment of the invention.

Method 200 includes a sequence of stages 210, 220 and 230.

Stage 210 may include dynamically determining a schedule of transmissions of broadcast messages and of paging messages to be received by DECT ULE devices.

Stage 220 may include generating and transmitting, by a ULE DECT ULE base station, dummy bearers in response to the schedule; wherein each dummy bearer comprises multiple usage fields and a usage indicative field; wherein the usage indicative field is indicative of a selected usage of the multiple usage field; wherein the selected usage purpose is selected out of at least a conveyance of a broadcast message and a conveyance of a paging message.

Stage 230 may include sending to the DECT ULE devices location information indicative of at least one bit allocated within at least one dummy bearer for indicating, when flagged, of a presence of a paging message or a broadcast message aimed to at least one of the DECT ULE devices.

FIG. 6 illustrates various stages 221-225 that may be included in stage 220 of method 200 according to an embodiment of the invention.

Stage 221 may include generating dummy bearers that include a sequence of fields that includes a preamble field, a synchronization field, a control information field, a first cyclic redundancy check (CRC) field, a synchronization word field, a second CRC field, a first sub-field that includes a first multiple usage field and a pair of usage indicative fields, a third CRC field, a synchronization information subfield, a fourth CRC field, a third sub-field that includes the second multiple usage field, and a fifth CRC field.

Stage 222 may include generating dummy bearers that include a sequence of fields that includes a preamble field, a synchronization field, a control information field, a first cyclic redundancy check (CRC) field, a synchronization word field, a second CRC field, a first sub-field that includes a first multiple usage field and a pair of usage indicative fields, a third CRC field, a synchronization information subfield, a fourth CRC field, a third sub-field that includes the second multiple usage field, and a fifth CRC field. The first sub-field further includes a third multi usage field.

Stage 223 may include generating a dummy bearer that includes a broadcast message that includes a paging identifier that identifies a certain DECT ULE device of the DECT ULE devices as a target to the broadcast message; wherein the paging identifier is shorter than a temporary portable user identity (TPUI) allocated to the certain DECT ULE device. The paging identifier may have a length that ranges between eight bits and eighteen bits (depending, for example on the number of DECT ULE devices to be controlled).

Stage 224 may include sending to a group of DECT ULE devices a group identifier and generating a broadcast message that includes the group identifier that identifies the group of DECT ULE devices as a target to the broadcast message.

Stage 225 may include generating dummy bearers with a plurality of multiple usage fields and one or more usage indicative fields associated with the plurality of the multiple usage fields.

FIG. 7 illustrates a DECT ULE base station 310 and multiple DECT ULE devices according to an embodiment of the invention.

DECT ULE base station 310 includes scheduler 310, dummy bearer generator 320, configuration module 330, transmitter 340 and receiver 350. The DECT base station can communicate with various DECT ULE devices such as DECT ULE devices 360-365. FIG. 9 also shows DECT ULE devices 360 and 361 as forming a DECT ULE group 370. A DECT ULE device can belong to one or more groups.

The scheduler 310 is arranged to dynamically determine a schedule of transmissions of broadcast messages and of paging messages to be received by DECT ULE devices. Thus, the schedule can change over time and the scheduler 310 can provide different allocation of beacon bits to different devices.

The dummy bearer generator 320 is arranged to generate dummy bearers in response to the schedule; wherein each dummy bearer comprises a multiple usage field and a usage indicative field; wherein the usage field is indicative of a selected usage of the multiple usage field; wherein the selected usage purpose is selected out of at least a conveyance of a broadcast message and a conveyance of a paging message.

The configuration module 330 is arranged to generate location information indicative of a location of at least one bit allocated within at least one dummy bearer for indicating, when flagged, of a presence of a paging message or a broadcast message aimed to at least one of the DECT ULE devices.

The transmitter 340 is arranged to transmit to the DECT ULE devices the dummy bearers and the location information.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an" The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for ultra low energy (ULE) digital enhanced cordless telecommunication (DECT), the method comprises:
    dynamically determining a schedule of transmissions of broadcast messages and of paging messages to be received by DECT ULE devices;
    generating and transmitting, by a DECT ULE base station, dummy bearers in response to the schedule;
    wherein each dummy bearer comprises a multiple usage field and a usage indicative field; wherein the usage indicative field is indicative of a selected usage of the multiple usage field;
    wherein the selected usage purpose is selected out of at least a conveyance of a broadcast message and a conveyance of a paging message; and
    sending to the DECT ULE devices location information indicative of at least one paging bit allocated within at least one dummy bearer for indicating, when flagged, of a presence of a paging message or a broadcast message aimed to at least one of the DECT ULE devices.

2. The method according to claim 1, comprising generating dummy bearers with a plurality of multiple usage fields and one or more usage indicative fields associated with the plurality of the multiple usage fields.

3. The method according to claim 1, comprising generating dummy bearers that comprises a sequence of fields that comprises a preamble field, a synchronization field, a control information field, a first cyclic redundancy check (CRC) field, a synchronization word field, a second CRC field, a first sub-field that comprises a first multiple usage field and a pair of usage indicative fields, a third CRC field, a synchronization information subfield, a fourth CRC field, a third sub-field that comprises the second multiple usage field, and a fifth CRC field.

4. The method according to claim 3, wherein the first sub-field further comprises a third multi usage field.

5. The method according to claim 1, comprising generating a dummy bearer that comprises a broadcast message that comprises a paging identifier that identifies a certain DECT ULE device of the DECT ULE devices as a target to the broadcast message; wherein the paging identifier is shorter than a temporary portable user identity (TPUI) allocated to the certain ULE DECT device.

6. The method according to claim 5, wherein the paging identifier has a length that ranges between eight bits and eighteen bits.

7. The method according to claim 1, comprising sending to a group of DECT ULE devices a group identifier and generating a broadcast message that comprises the group identifier that identifies the group of DECT ULE devices as a target to the broadcast message.

8. The method according to claim 1, wherein the at least one paging bits is allocated for indicating, when flagged, of a presence of a paging message or a broadcast message aimed to a group of DECT ULE devices.

9. The method according to claim 1, wherein the location information is indicative of a location, within a super frame and a frame, of the at least one paging.

10. The method according to claim 1, wherein the location information is indicative of a repetition period of the appearance of the at least one paging bit.

11. An ultra low energy (ULE) digital enhanced cordless telecommunication (DECT) base station that comprises:
    a scheduler that is arranged to dynamically determine a schedule of transmissions of broadcast messages and of paging messages to be received by DECT ULE devices;
    a dummy bearer generator arranged to generate dummy bearers in response to the schedule; wherein each dummy bearer comprises a multiple usage field and a usage indicative field; wherein the usage indicative field is indicative of a selected usage of the multiple usage field; wherein the selected usage purpose is selected out of at least a conveyance of a broadcast message and a conveyance of a paging message;
    a configuration module that is arranged to generate location information indicative of a location of at least one bit allocated within at least one dummy bearer for indicating, when flagged, of a presence of a paging message or a broadcast message aimed to at least one of the DECT ULE devices; and
    a transmitter that is arranged to transmit to the DECT ULE devices the dummy bearers and the location information.

12. The DECT ULE base station according to claim 11, wherein the dummy bearer generator is arranged to generate dummy bearers with a plurality of multiple usage fields and one or more usage indicative fields associated with the plurality of the multiple usage fields.

13. The DECT ULE base station according to claim 11, wherein the dummy bearer generator is arranged to generate dummy bearers that comprise a sequence of fields that comprise a preamble field, a synchronization field, a control information field, a first cyclic redundancy check (CRC) field, a synchronization word field, a second CRC field, a first sub-field that comprises a first multiple usage field and a pair of usage indicative fields, a third CRC field, a synchronization information subfield, a fourth CRC field, a third sub-field that comprises the second multiple usage field, and a fifth CRC field.

14. The DECT ULE base station according to claim 13, wherein the first sub-field further comprises a third multi usage field.

15. The DECT ULE base station according to claim 11, wherein the dummy bearer generator is arranged to generate a dummy bearer that comprises a broadcast message that comprises a paging identifier that identifies a certain DECT ULE device of the DECT ULE devices as a target to the broadcast message; wherein the paging identifier is shorter than a temporary portable user identity (TPUI) allocated to the certain DECT ULE device.

16. The DECT ULE base station according to claim 15, wherein the paging identifier has a length that ranges between eight bits and eighteen bits.

17. The DECT ULE base station according to claim 11, wherein the configuration element is arranged to send to a group of DECT ULE devices a group identifier and wherein the dummy bearer generator is arranged to generate a dummy bearer that comprises a broadcast message that comprises the group identifier that identifies the group of DECT ULE devices as a target to the broadcast message.

18. A non-transitory computer readable medium that stores instructions that once executed by a ultra low energy digital enhanced cordless telecommunication (DECT ULE) base station causes the DECT ULE base station to:
   dynamically determine a schedule of transmissions of broadcast messages and of paging messages to be received by DECT ULE devices;
   generate and transmit dummy bearers in response to the schedule; wherein each dummy bearer comprises a multiple usage field and a usage indicative field; wherein the usage indicative field is indicative of a selected usage of the multiple usage field; wherein the selected usage purpose is selected out of at least a conveyance of a broadcast message and a conveyance of a paging message; and
   send to the DECT ULE devices location information indicative of at least one bit allocated within at least one dummy bearer for indicating, when flagged, of a presence of a paging message or a broadcast message aimed to at least one of the DECT ULE devices.

19. The non-transitory computer readable medium according to claim 18 that stores instructions that once executed by the DECT ULE base station causes the DECT ULE base station to generate dummy bearers with a plurality of multiple usage fields and one or more usage indicative fields associated with the plurality of the multiple usage fields.

20. The non-transitory computer readable medium according to claim 18, wherein the dummy bearer generator is arranged to generate dummy bearers that comprise a sequence of fields that comprise a preamble field, a synchronization field, a control information field, a first cyclic redundancy check (CRC) field, a synchronization word field, a second CRC field, a first sub-field that comprises a first multiple usage field and a pair of usage indicative fields, a third CRC field, a synchronization information subfield, a fourth CRC field, a third sub-field that comprises the second multiple usage field, and a fifth CRC field.

21. The non-transitory computer readable medium according to claim 20, wherein the first sub-field further comprises a third multi usage field.

* * * * *